US008654519B2

(12) United States Patent
Visser et al.

(10) Patent No.: US 8,654,519 B2
(45) Date of Patent: Feb. 18, 2014

(54) ELECTRONIC DEVICE WITH A FLEXIBLE DISPLAY

(75) Inventors: Hendrik Dirk Visser, Eindhoven (NL); Michael Johannes Anna Maria Walters, Eindhoven (NL); Johannes Cornelis Adriaan Hamers, Breugel (NL); Hjalmar Edzer Ayco Huitema, Veldhoven (NL)

(73) Assignee: Creator Technology B.V., Breda (NL)

( * ) Notice: Subject to any disclaimer, the term of this patent is extended or adjusted under 35 U.S.C. 154(b) by 562 days.

(21) Appl. No.: 12/744,246

(22) PCT Filed: Nov. 21, 2008

(86) PCT No.: PCT/NL2008/050740
§ 371 (c)(1),
(2), (4) Date: Oct. 26, 2010

(87) PCT Pub. No.: WO2009/067010
PCT Pub. Date: May 28, 2009

(65) Prior Publication Data
US 2011/0043976 A1 Feb. 24, 2011

Related U.S. Application Data

(60) Provisional application No. 60/989,718, filed on Nov. 21, 2007.

(51) Int. Cl.
*H05K 5/00* (2006.01)
*H05K 7/00* (2006.01)
*G06F 1/16* (2006.01)

(52) U.S. Cl.
USPC ............... 361/679.21; 361/679.26; 361/679.3

(58) Field of Classification Search
USPC .............. 361/679.01, 679.21, 679.26, 679.3, 361/679.56; 455/575.1, 575.3, 575.4, 575.9
See application file for complete search history.

(56) References Cited

U.S. PATENT DOCUMENTS

| 7,180,665 | B2* | 2/2007 | Daniel et al. .................. 359/461 |
| 7,667,962 | B2* | 2/2010 | Mullen ..................... 361/679.56 |
| 7,864,418 | B2* | 1/2011 | Kuroi et al. .................... 359/443 |
| 7,952,801 | B2* | 5/2011 | Yuzawa ......................... 359/443 |

(Continued)

FOREIGN PATENT DOCUMENTS

| WO | WO 2004/047059 A | 6/2004 |
| WO | WO 2004/114259 A | 12/2004 |
| WO | WO 2006/085271 A | 8/2006 |

*Primary Examiner* — Anthony Haughton

(57) ABSTRACT

The invention relates to an electronic apparatus 10 comprising with a flexible display 2, which may be extendable from a housing 5 upon use. In accordance with the invention, the edge portions 3 are provided with an edge protector having an upper surface P1 and a lower surface P2, said edge protector being comprised of segments 6a, 6b, 6c, 6d, 8a, 8b, 8c, 8d, which may be interconnected by hinges 9a, 9b, 9c. The segments of the edge protector are arranged above and below the edge portions of the flexible display 2 and are preferably displaceable during translation of the flexible display from a collapsed to an extended state and back. Preferably, the hinges 9a, 9b, 9c are arranged for enabling a vertical V and/or a horizontal H displacement of the segments. The segmented edge protector is arranged for being moved together with the display and to be stored together with it, so that the segments 6a, 6b, 6c, 6d, 8a, 8b, 8c, 8d substantially do not loose contact with the edge portion during storage.

17 Claims, 7 Drawing Sheets

(56) References Cited

Figure 1B:
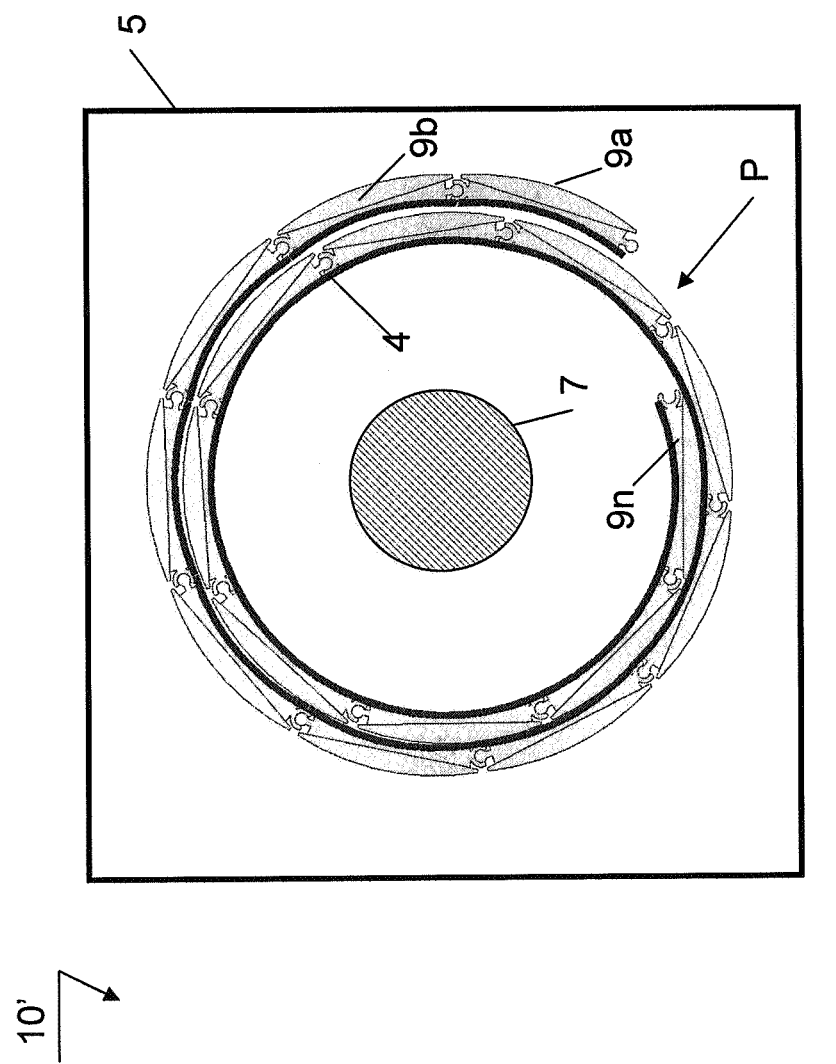

U.S. PATENT DOCUMENTS 8,009,422 B2 * 8/2011 Misawa .................. 361/679.55
2002/0090980 A1 7/2002 Wilcox et al.
2004/0183958 A1 * 9/2004 Akiyama et al. ................ 349/58
2005/0041012 A1 * 2/2005 Daniel et al. .................. 345/156

* cited by examiner

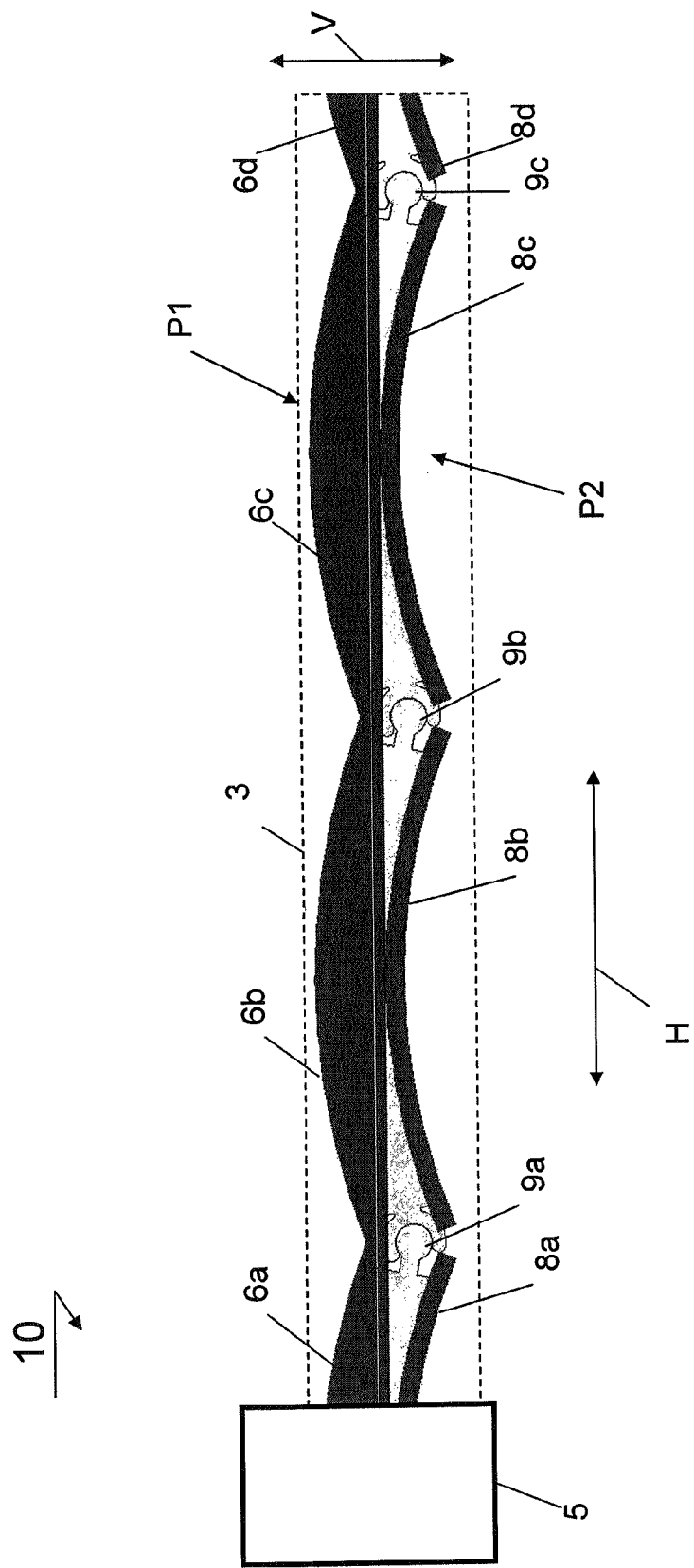

ELECTRONIC DEVICE WITH A FLEXIBLE DISPLAY

FIELD OF THE INVENTION

The invention relates to an electronic device comprising a flexible display.

BACKGROUND OF THE INVENTION

An embodiment of an electronic device comprising a flexible display is known from WO 2004/114259. The known electronic device relates to a display device comprising an extendable, notably rollable display, provided with an extendable side member. The known extendible side member is arranged for providing support and structural rigidity to the flexible display. The known side member is also arranged to provide a solid edge by abutting to the flexible display from a periphery, notably for protecting potentially delicate edge of the display material. In the known display device the display area and the side member conceived to cooperate with the edge portions thereof are stored separately in a housing of the device. In fact, the known display is wound around a suitable roller, whereas the side member is shoved into internal storage channels provided inside the housing next to the roller and substantially parallel to it. It will be appreciated that in the construction of the known display device the flexible display is translated substantially in parallel to its plane and the side members undergo a 90 degree bend when being alternated between a storage position and the extended position.

It is a disadvantage of the known display device in that the side members undergo substantial mechanical stress during a process of extending and collapsing. This may lead to a material fatigue causing a deformation of the side member leading to a failure in display support and/or protection.

SUMMARY OF THE INVENTION

It is an object of the invention to provide an electronic device comprising a flexible display provided with improved display's edge protector, whereby the edge protector has a further structural function.

To this end in the electronic device according to the invention a flexible display is arranged to be alternated between a collapsed state and an extended state, said flexible display comprises edge portions and is further provided with an edge protector cooperating with the edge portions, wherein said edge protector is conceived to be alternated between a collapsed state and an extended state and comprises a plurality of segments, said electronic device further comprises a mechanism conceived to cooperate with said segments for spatially ordering the segments at least in said extended state.

It is found to be advantageous to arrange an edge protector with segments and to provide for cooperation of these segments with a mechanism conceived for spatially ordering the segments in the extended state. It is found that spatially ordered segments not only protect edge portions, but also prevent the flexible display from sagging from a substantially flat plane wherein it is stretched in the extended state. In this way, the segments may add to mechanical stability of the flexible display in its extended state or in its partially extended state. It will be appreciated that it is also possible that the mechanism is arranged for spatially ordering the segments of the edge protector for its collapsed stated. It will further be appreciated that the spatial ordering in the extended state may relate to aligning the segments in a head-to-tail fashion, for example. Preferably, in the head-to-tail order there is substantially no space between a preceding and a following segment. Spatial ordering in the collapsed state may relate to a different or slightly different mutual configuration of the segments, for example by providing a space between a preceding and a following segment so that the edge protector may easily be collapsed without causing deformation or damaging thereof. A preferable embodiment of a collapsed state of the edge protector is a rolled-up configuration.

In an embodiment of the electronic device according to the invention the segments comprise rigid portions interconnected by a hinge.

It is found to be advantageous to provide a degree of freedom for the individual segments so that they can be ordered by the mechanism without a substantial application of an external force. A hinged interconnection provides for such possibility. Preferably, the segments are arranged to be displaceable in a direction transverse to a direction of collapsing or extending. For example, if one assumes a direction of collapsing and extending to be in a horizontal direction, such displacement may be realized either in a horizontal, or in a vertical direction. Alternatively, such displacement may be realized in both vertical and horizontal direction, simultaneously.

In a further embodiment of the electronic apparatus according to the invention the segments are shaped for receiving at least a part of the edge portion of the flexible display.

This feature has an advantage in that the edge protector does not only substantially abut the edge portion of the flexible display, but provides a protective compartment for preventing damage of the edge portion of the flexible display due to excessive bending, for example in the collapsed state. The segments of the edge protector may be U-shaped, L-shaped or C-shaped realizing said protective compartments.

In a further embodiment of the electronic device according to the invention the segments are interconnected below a surface of the flexible display.

It is found to be advantageous to interconnect left and right segment chains below a surface of the display. Preferably, by means of such interconnection a protective sheath beneath the flexible display is formed for protecting a back surface of the display. Due to this feature durability of the electronic device comprising the flexible display is improved.

In a further embodiment of the electronic device according to the invention the mechanism comprises a curved stripe of a substantially rigid material capable of rolling, said stripe being arranged in a portion of the segment conceived for receiving the edge portion of the flexible display.

It is found to be advantageous to provide means enabling shape bi-stability of the segmented edge protector. By providing a curved stripe of a substantially rigid material capable of rolling, for example a structure similar to a known rollable metal measuring tape, the edge protector of the electronic device according to the invention is enabled to have two mechanically stable positions—a rolled-up position and an extended position. It is noted that a rigidity of the curved stripe is used to prevent the segments of the edge protector from a vertical displacement, for example from sagging.

In a further embodiment of the electronic device according to the invention the hinges are flexible.

It is found to be advantageous to provide the electronic device with low-cost yet reliable hinge devices interconnecting respective segments. Flexible hinges are manufactured from a flexible plastic and are known per se. Another advantage of using flexible hinges is an easy maintenance and substantially no dust accumulation in the hinge area, the latter being particularly important for rollable flexible display, as dust particles may cause damage to the flexible display when rolled-up together with it.

In a further embodiment of the electronic apparatus according to the invention the mechanism comprises an elastic body cooperating with a spring.

This particular embodiment has an advantage that the elastic body acts on the segments and pushes them together so that a substantially flat arrangement of the segments can be realized. When the elastic body is released from its tension the segmented edge protector may be collapsed for storage. Preferably, the elastic body is arranged with an elastic pre-tension by means of a spring. More preferably, the elastic body, for example an elastic rope or the like is put through the segments. For example, the elastic body may be used instead of respective axis of the segments, thereby simplifying the assembly of the edge protector.

In a further embodiment of the electronic device according to the invention the mechanism comprises a set of magnets arranged on individual segments for spatially ordering the segments by means of attractive magnetic force.

It is found to be advantageous to use magnetic means, like small constant magnets, arranged on the individual segments for suitably aligning them in the extended state and upon storage. This embodiment has an advantage in that the magnets provide simple and reproducible means for implementing such alignment. Preferably, the magnets are arranged on a leading edge and a trailing edge of each segment for enabling a generation of the attractive force between a magnet of a preceding segment and a magnet of a following segment. In a particular embodiment, the segments may be symmetrical with respect to a longitudinal axis and may be rotatable about a point positioned on said axis. In this case the magnets may be arranged at both sides of each segment with respect to said axis. It is found to be advantageous to use a V-shaped segments, so that a trailing edge and a leading edge of the segments are V-shaped, whereby a point of rotation of each segment is positioned substantially at an origin of the V-shape. Such cooperation of the magnets with the shape of the segments ensures a further improvement of an efficacy of spatial ordering the segments in the extended state. Preferably, the magnets are arranged substantially symmetrically with respect to the longitudinal axis. This embodiment will be discussed in more detail with reference to FIGS. 5a, 5b.

These and other aspects of the invention will be further discussed with reference to figures, wherein like reference signs relate to like items.

BRIEF DESCRIPTION

FIG. 1a presents in a schematic way a detailed view of the edge protector of the electronic device according to the invention in an extended state.

FIG. 1b presents in a schematic way a detailed view of the edge protector of the electronic device according to the invention in a collapsed state.

Figure 2:
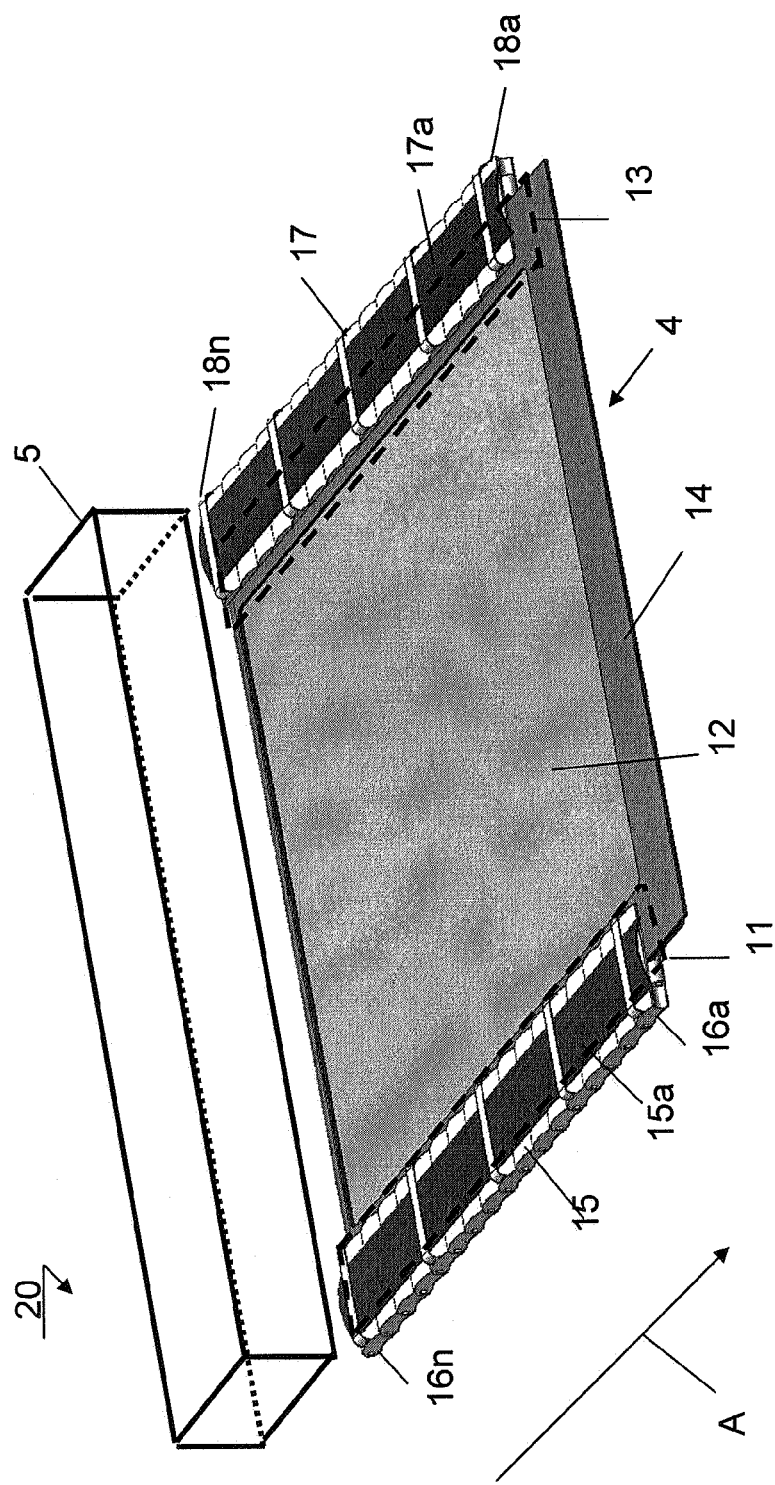

FIG. 2 presents in a schematic way the edge protector provided with an embodiment of the mechanism.

Figure 3:
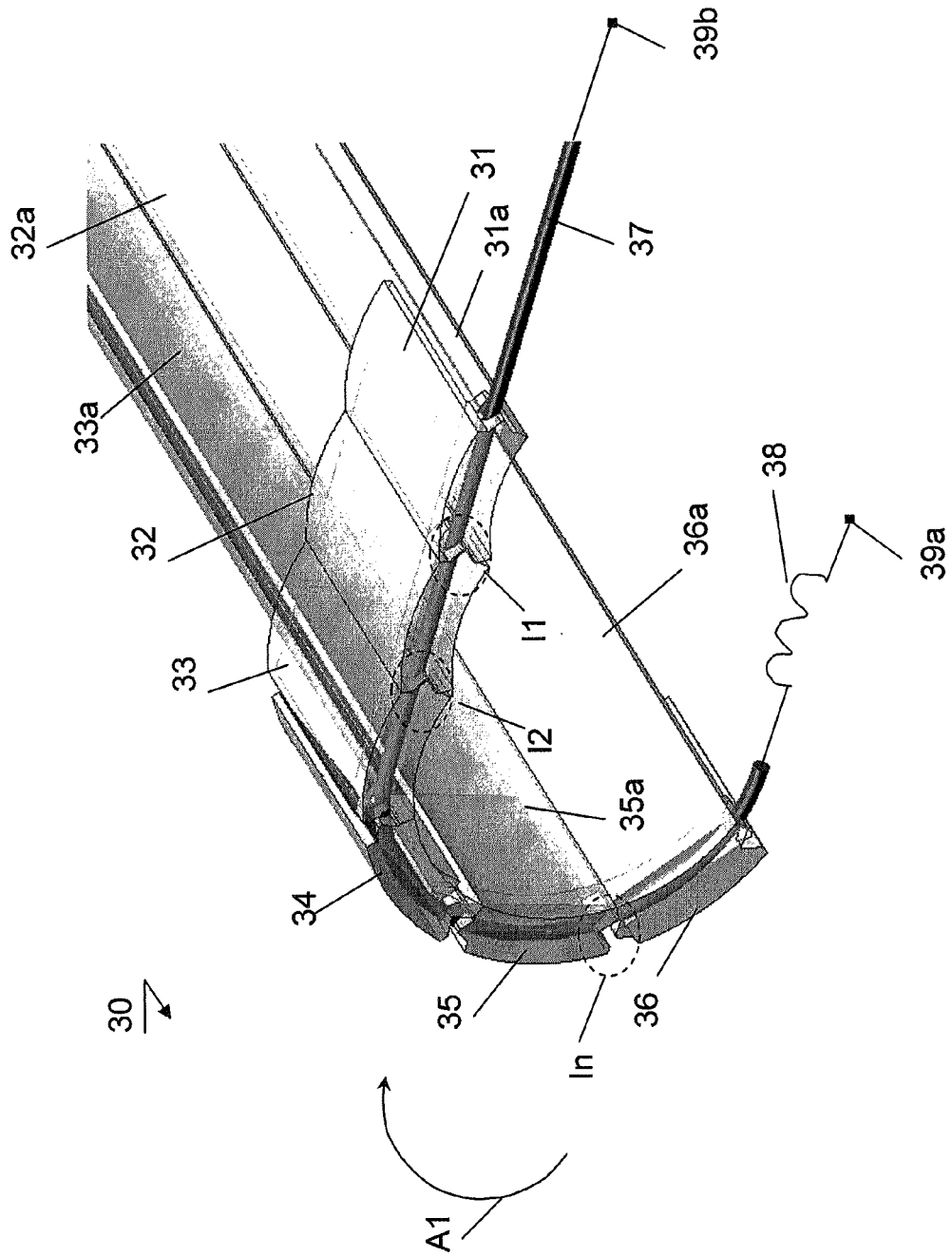

FIG. 3 presents in a schematic way the edge protector provided with a further embodiment of the mechanism.

Figure 4:
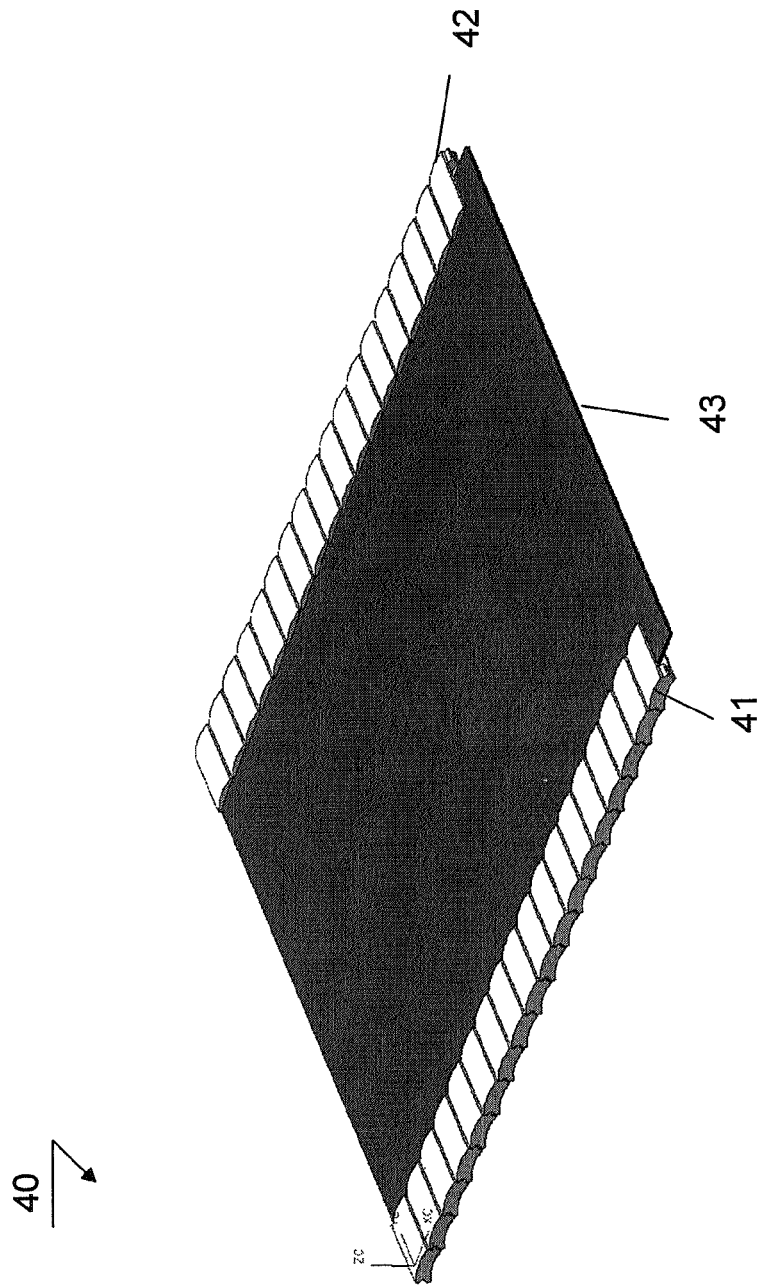

FIG. 4 presents in a schematic way the edge protector provided with a still further embodiment of the mechanism.

Figure 5A:
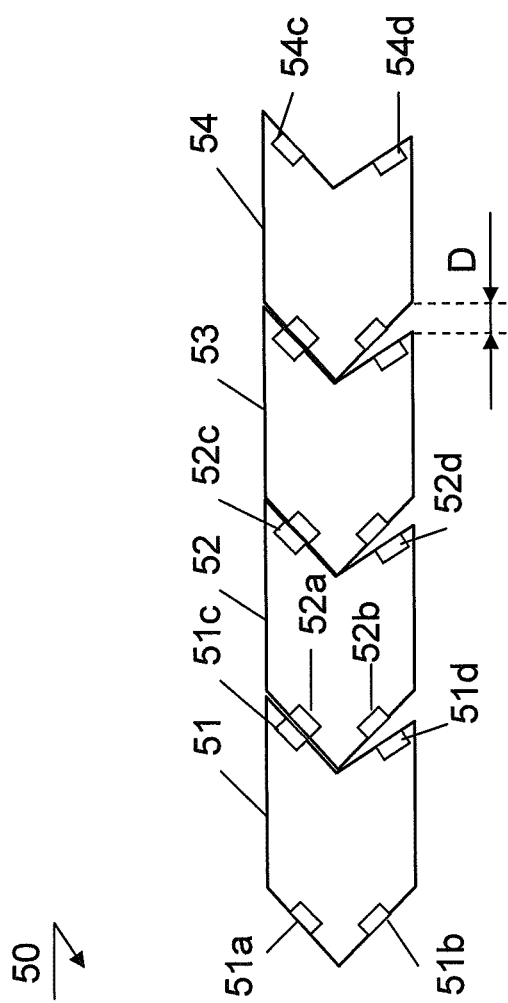

FIG. 5a presents in a schematic way an embodiment of the edge protector provided with magnetic means in an extended state.

Figure 5B:
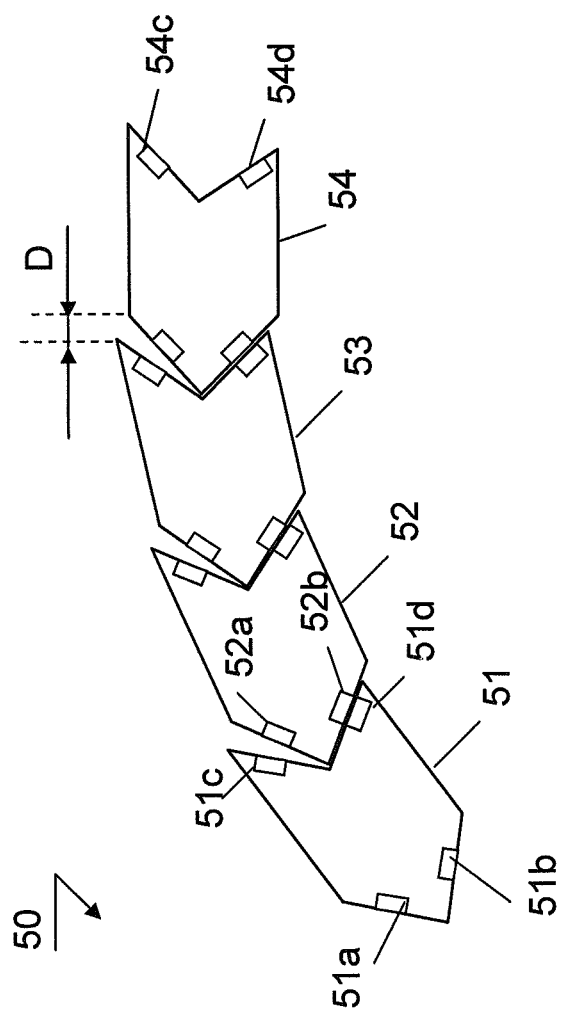

FIG. 5b presents in a schematic way an embodiment of the edge protector provided with magnetic means in a collapsed state.

DETAILED DESCRIPTION

FIG. 1a presents in a schematic way a detailed view of the edge protector of the electronic device according to the invention in an extended state. FIG. 1a schematically presents a vertically section 10 of an electronic apparatus provided with a flexible display 2, which may be extendable from a housing 5 upon use. It will be appreciated that the flexible display is a structure comprising an active area with a suitable user interface (not shown) surrounded by one or more lateral edge portions 3, which are preferably not used for the user interface. In accordance with the invention, the edge portions 3 are provided with an edge protector having an upper surface P1 and a lower surface P2, said edge protector being comprised of segments 6a, 6b, 6c, 6d, 8a, 8b, 8c, 8d, which may be interconnected by hinges 9a, 9b, 9c, thereby resembling a caterpillar structure provided above and below the edge portions of the flexible display 4. It is noted that either rigid or flexible hinges may be used for the hinges 9a, 9b, 9c. The segments of the caterpillar structure are preferably displaceable during translation of the flexible display from a collapsed to an extended state and back. Preferably, the hinges 9a, 9b, 9c are arranged for enabling a vertical V and/or a horizontal H displacement of the segments. In a particular embodiment, the segments 6a, 6b, 6c, 6d, 8a, 8b, 8c, 8d may be interconnected to form a U-, L- or C-shaped structure for receiving the edge portion of the flexible display. It will be appreciated that the segmented edge protector is arranged for being moved together with the display and to be stored together with it, so that the segments 6a, 6b, 6c, 6d, 8a, 8b, 8c, 8d substantially do not loose contact with the edge portion during storage. This feature improves protective properties of the edge protector according to the invention.

FIG. 1b presents in a schematic way a detailed view of the edge protector of the electronic device according to the invention in a collapsed state. The edge protector P comprises a set of segments 9a, 9b, . . . 9n arranged for protecting at least edge portions of a flexible display (not shown). In the collapsed state the flexible display may be wound together with the segmented edge protector about a suitable roller 7 in the housing 5 of an electronic apparatus. It is noted that in a collapsed state the segments forming the edge protector may provide a support surface for a flexible display area corresponding to a further revolution about the roller 7. It will be appreciated that also U-, L- or C-shaped segmented edge protector may be used for similar storage in a wound-up state.

FIG. 2 presents in a schematic way an embodiment 20 of the edge protector provided with the mechanism. The flexible display is extendable from the housing 5 in a direction indicated by arrow A. The edge protector comprises two chains of caterpillar trains 11, 13 comprising segments 16a, . . . 16n and 18a, . . . 18n arranged as U-shaped structures. However, other geometrical configuration of respective segments is possible. The flexible display is schematically shown in it's expended state with respect to the housing 5. The flexible display comprises an active area 12 whereon a suitable user interface is provided, said active area being surrounded by edge regions 11, 14, 13. Usually a frontal edge portion 14 is protected by a suitable laminate and is used as a grip region for extending and/or for collapsing the display. It will be appreciated that the flexible display is translated in a direction substantially parallel to a longitudinal direction of the lateral edge portions 11, 13. In this way, the frontal edge portion 14 does not substantially deform upon rolling. The lateral edge portions 11, 13 of the flexible display are received at least partially in the segmented edge protectors 15, 17. Each of the edge protectors 15, 17 in their respective areas conceived for receiving edge portions of the flexible display are provided with respective mechanisms 15a, 17a, it being respective curved stripes of a substantially rigid material capable of rolling. Preferably, a curvature of such stripe matches curvature of the storage roll the segments are to be rolled about upon storage. The curved stripe of a rigid material, for example a curved metal stripe acts as a bi-stability means due to the fact that such stripe has two pre-determined favorable positions, a rolled-up position (for storage) and a stretched position (for the extended state). Due to this mechanism the segments are ordered with respect to each other in the chain and are prevented from sagging from a substantially flat plane wherein the flexible display is positioned upon use.

FIG. 3 presents in a schematic way the edge protector provided with a further embodiment of the mechanism. In this particular embodiments the edge protector is provided with segments 31, 32, 33, . . . , 36, wherein respective segments of the lateral edge protectors are interconnected forming a lower protective sheet for the flexible display (not shown), said sheet comprising respective portions 31a, 32a, . . . , 36a. A further embodiment of the mechanism for spatially ordering the segments in the extended state comprises an elastic body 37, cooperating with a spring 38. Both ends of such elastic mechanism are fixed at terminal portions 39a, 39b. The flexible display may be extended from a rolled-up storage position upon use in a direction indicated by an arrow A1. Preferably, the spring 38 is releasably arranged for inducing a pre-tension on the elastic body in the extended state. As a result, the individual segments are pulled together by an action of the tension of the elastic mechanism 37, 38. Preferably, the segments are shaped with cooperating indentations I1, I2, . . . In so that they form a substantially rigid and flat structure when spatially ordered by the elastic mechanism.

FIG. 4 presents in a schematic way the edge protector provided with a still further embodiment of the mechanism. In this embodiment the lateral segmented edge protectors are arranged on an elastic sheet 43, for example rubber. Preferably, the elastic sheet has a pretension which acts on the segments in the extended state for spatially ordering them. Such pre-tension may be realized by stretching the elastic sheet before assembly of the segments. The segments may be glued to the elastic sheet or, alternatively, they may be co-molded together with it. In case of co-molding the pretension in the elastic sheet may be obtained by choosing a material that shrinks to a greater extend during cooling of the mold than the material of the segments. Also in this embodiment of the elastic mechanism for spatially ordering the segments, the pre-tension of the elastic sheet causes the segments to be pressed together and thereby to be forced in a substantially flat position. This action can be regarded as an implementation of a bi-stability, wherein a first stable position is realized for a collapsed (rolled-up) state and a second stable position is realized for an extended state. It will be appreciated that the elastic sheet may be substituted by a suitable number of stripes of an elastic material, said stripes may be positioned inside the segments, below the segments or in any other suitable area of the display, for example in a geometric center-line of the display. By positioning the elastic sheet in the geometric center-line of the flexible display, its action is about the same on both laterally positioned segments. In addition, when such stripe of elastic material is positioned below a surface of the flexible display, it advantageously acts as a spacer for protecting the collapsed flexible display against incidental damage, for example caused by particles transported together with the flexible display to a storage position.

FIG. 5a presents in a schematic way an embodiment of the edge protector provided with magnetic means in an extended state. In this embodiment an isolated segmented edge protector is shown. The mechanism for ordering the segments of the edge protector comprises magnets 51a, 51b, . . . , 54c, 54d arranged on a leading edge of each segment and on a trailing edge of each segment so that a magnet or magnets 51c, 51d of a preceding segment 51 cooperate with a magnet or magnets 52a, 52b of a following segment 52. The magnets interact by means of an attractive magnetic force thereby spatially ordering individual segments in an extended state. It is noted, that it is possible to use a sole magnet per leading or trailing edge, as well as a suitable plurality of magnets per leading or trailing edge of each segments. It will be appreciated that the leasing and trailing edges of the subsequent segments are formed for enabling both a flat configuration in the extended state and a rolled-up configuration in a collapsed state. For this reason it may be advantageous to arrange for a spacing D between cooperating surfaces of a leading edge and a trailing edge of adjacent segments. A corresponding arrangement upon collapsing is schematically shown in FIG. 5b. It will be appreciated that segments, 51b, 51d, . . . 54d are optional. However, their presence facilitates a better spatial ordering of the segments of the edge protector not only for an extended state, but also for a collapsed state. The latter is advantageous, because damage by torsion of the flexible display is avoided when the segments are properly spatially arranged in a rolled-up state. The same proper ordering for the rolled-up state is enabled by the embodiments of FIGS. 3 and 4. Embodiment of FIG. 2 provides for such ordering in the collapsed state when the stripes of the rigid material are provided above and below respective segment chains, limiting vertical displacement of individual segments during collapsing. It will further be appreciated that the invention may also be applied for electronic apparata wherein the flexible display is conceived to be wrapped about a body. In this case the invention may be applied to areas, wherein the flexible display undergoes deformation.

It will be appreciated that while specific embodiments of the invention have been described above, it will be appreciated that the invention may be practiced otherwise than as described. In addition, isolated features discussed with reference to different figures may be combined.

The invention claimed is:
1. An electronic device comprising:
a roller;
a flexible display arranged to be alternated between a collapsed state and an extended state, said flexible display comprising edge portions and being further provided with an edge protector cooperating with the edge portions, wherein
said edge protector is configured to be alternated between a collapsed state and an extended state and comprises a plurality of segments, said electronic device further comprising a mechanism configured to cooperate with said segments for spatially ordering the segments at least in said extended state, arranged such that the edge protector, the mechanism and the flexible display are wound around the roller in the collapsed state.
2. The electronic device according to claim 1, wherein the segments comprise rigid portions interconnected by hinges.
3. The electronic device according to claim 1, wherein the segments are displaceable in a direction transverse to a direction of collapsing or extending.

4. The electronic device according to claim 1, wherein the segments are shaped for receiving at least a part of the edge portion of the flexible display.

5. The electronic device according to claim 1, wherein the segments are interconnected to form a U-, L- or C-shaped structure for receiving at least a part of the edge portion of the flexible display.

6. The electronic device according to claim 1, wherein the segments are interconnected below a surface of the flexible display.

7. The electronic device according to claim 6, wherein the segments form a protective sheath, the protective sheath protecting a back surface of the display.

8. The electronic device according to claim 4, wherein the mechanism comprises a curved strip of a substantially rigid material capable of rolling, said strip being arranged in a portion of the segment configured for receiving the edge portion of the flexible display.

9. The electronic device according to claim 2, wherein the hinges are flexible.

10. The electronic device according to claim 1, wherein the mechanism comprises an elastic body cooperating with a spring.

11. The electronic device according to claim 10, wherein the spring is releasably arranged for inducing pre-tension on the elastic body.

12. The electronic device according to claim 11, wherein the elastic body comprises an elongated body.

13. The electronic device according to claim 1, wherein the mechanism comprises a set of magnets arranged on individual segments for spatially ordering the segments by means of attractive magnetic force.

14. The electronic device according to claim 13, wherein the magnets are arranged on a leading edge and a trailing edge of each segment for enabling a generation of the attractive force between a magnet of a preceding segment and a magnet of a following segment.

15. The electronic device according to claim 14, wherein the segments are symmetrical with respect to a longitudinal axis and are rotatable about a point positioned on said axis, said magnets being arranged at both sides with respect to said axis.

16. The electronic device according to claim 15, wherein the trailing edge and the leading edge of the segments are V-shaped, said point being positioned substantially at an origin of the V-shape.

17. The electronic device according to claim 16, wherein the magnets are arranged substantially symmetrically with respect to the longitudinal axis.

* * * * *